United States Patent Office 3,492,404
Patented Jan. 27, 1970

3,492,404
METHODS FOR CONTROLLING NEMATODES WITH COMPOSITIONS CONTAINING DIAZINON
Alfred Margot, Basel, and Clemens Kocher, Therwil, Basel-Land, Switzerland, assignors to J. R. Geigy A.G., Basel, Switzerland
No Drawing. Continuation of application Ser. No. 506,133, Nov. 2, 1965. This application Feb. 23, 1968, Ser. No. 707,882
Int. Cl. A01n 9/36
U.S. Cl. 424—200      2 Claims

ABSTRACT OF THE DISCLOSURE

There is provided a nematocidal composition comprising O,O-diethyl-O-(2-isopropyl-4-methyl - 6 - pyrimidyl) thiophosphate and an emulsifier consisting essentially of a calcium salt of dodecyl benzene sulfonate and nonylphenol polyoxyethylene in butanol. The compositions are useful for controlling nematodes.

---

This application is a continuation of application Ser. No. 506,133, filed Nov. 2, 1965, and abandoned since the filing of this application.

This invention relates to nematocidal compositions comprising a phosphoric acid ester admixed with a special emulsifying agent.

The phosphoric acid ester exhibiting superior nematocidal effects in the compositions of this invention is O,O-diethyl-O-(2-isopropyl-4-methyl - 6 - pyrimidyl)thiophosphate and has the following structural formula:

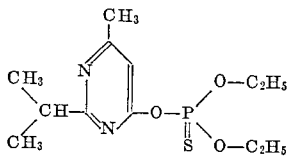

This phosphoric acid ester and methods of preparing the same are described in detail in the Gysin and Margot U.S. Patent No. 2,754,243. This compound is sold under the trademark "Diazinon" and is of great commercial value by virtue of its well-established insecticidal activity and consequent usefulness in pest control. This phosphoric acid ester has also been found to possess nematocidal activity.

According to the present invention, this nematocidal activity of the above phosphoric acid ester can be enhanced, far beyond expectation, and thus rendered commercially significant by mixing such ester with a certain specific emulsifying agent. The nematocidal compositions containing this synergistic emulsifier, as compared with similar compositions containing other emulsifiers or no emulsfier, exhibit a wider spectrum of nematocidal activity for longer periods of time and also have greatly increased shelf-life.

The emulsifier used in the present compositions is marketed by Union Chimique Belge, of Brussels, Belgium under the trademark "Emullat P 140 HFP" and is a mixture of the calcium salt of dodecyl benzenesulfonate ("Argopon," about 33% by weight) and nonylphenol polyoxyethylene (Emullat PN, about 47% by weight) in butanol (about 20% by weight). About 5 to 40% by weight of this emulsifier is incorporated into the nematocidal compositions of this invention, with the preferred range being 15 to 30% by weight. The best results as regards both nematocidal effectiveness and stability of the compositions are obtained with 20 to 25% by weight, of emulsifier.

In preparing the compositions of this invention, it is usually desirable to include a small amount of an acid acceptor to act as a stabilizer of the dialkoxy phosphoric acid ester to prolong shelf-life of the compositions. Epoxidized linseed oil, epoxidized soybean oil, propylene oxide and epichlorhydrin are typical of the effective stabilizer materials. Stabilizer in an amount of about 2.5 to 7.5% by weight of the composition is adequate.

For ease of handling, the compositions may include a suitable solvent such as an aromatic petrolelm derivative, e.g. xylene, benzene, etc. If desired, the solvent may be omitted entirely.

The nematocidal compositions of this invention are amber, clear liquids and are readily emulsifiable when mixed with water. They are easily formulated by mixing the several components in any suitable vessel. The following illustrates the compositions of this invention in greater detail but without limitation thereto. Percentages throughout are by weight.

Composition I

| Component: | Percent |
|---|---|
| Technical (95%) "Diazinon" liquid | 57.2 |
| "Epoxol 7–4" (Epoxidized soybean oil) | 3.2 |
| "Emullat P 140 HFP" | 25.0 |
| Xylene | 14.6 |

Composition II

| | |
|---|---|
| Technical (95%) "Diazinon" liquid | 53.1 |
| Epichlorhydrin | 5.0 |
| "Emullat P 140 HFP" | 40.0 |
| Xylene | 1.9 |

Composition III

| | |
|---|---|
| Technical (95%) "Diazinon" liquid | 51.4 |
| "Epoxol 7–4" (Epoxidized soybean oil) | 5.7 |
| Xylene | 37.3 |
| "Atlox 1256" | 5.6 |

"Atlox 1256" is the trademark of an emulsifier sold by Atlas Chemical Industries and is the polyoxyethylene sorbitan ester of mixed fatty and resin acids.

The nematocidal activity of Compositions I and III was determined on a turf of Kentucky bluegrass and red fescue, set out over twelve months prior. Plots, measuring 10″ by 10″ using a table of random digits, were treated by mixing the composition to be tested, in water and applying the resultant emulsions as a drench with a 12 quart watering can. Each of the compositions was applied in three gallons of water, and the area was thoroughly watered for two to three hours following treatment, (equivalent to about ½″ water). The amount of composition used (86 ml./plot) was equivalent to 40 lbs. of phosphoric acid ester per acre. Treatments were randomized and replicated five times. Untreated adjacent plots were examined for appearance, and soil and root samples were removed for evaluation of nematocidal activity. Approximately two quarts of soil and roots were collected per treatment with each composition, by removing ten cores of turf at random per replicate with a standard sampling tube. The fifty cores per treatment were composited, homogenized and nematodes were extracted from the soil in the routine laboratory technique. Population estimates were made by counting plant parasitic genera contained in three one milliliter aliquots. Results are shown in the following table.

NEMATODE COUNTS

| Composition | Criconemiodes spp | Tylenchorhynchus spp | Helicotylenchus spp | Total* |
|---|---|---|---|---|
| I | 248 | 161 | 87 | 496 |
| III | 2,916 | 216 | 356 | 3,488 |
| Check | 3,086 | 884 | 752 | 4,722 |

*Total number per 250 ml. of soil

From the above table, it is apparent that Composition I is a far superior nematocide as compared with Composition III, the latter being one of the commercially acceptable prior art materials. Visual ratings of the plots showed that those treated with Composition I were superior in appearance and were of higher vigor as compared with those treated with Composition III. The check plots showed substantially complete lack of growth.

Similar tests were carried out on Everglades No. 1 Bermuda grass and Meyer zoysia grass in Florida, using Compositions II and III with check plots. These tests involved sting, lance, ring and spiral nematodes. Based on nematode counts and visual appearance of the grass after six weeks, Composition II gave excellent results. Composition III was better than the check plots but not as good as II. Sampling the plots after four months showed that Composition II gave still further reduction of nematode populations as compared with the six week counts. The nematode populations in the Composition III plots and in the checks had returned to substantially that of the pre-treatment levels. Even after fifteen months, Composition II was still effective and visual comparison showed that this composition was outstandingly superior to Composition III.

In another series of tests using Tifton 328 Bermuda grass in greenhouse flats, results after six weeks showed that Composition II gave 80 and 94.7% reduction of ring and sting nematodes respectively, and 61.7% total reduction of all plant parasitic forms present, while parallel tests with Composition III gave 46.0 and 94.7% reduction in ring and sting nematodes respectively, and a 50.7 total reduction of all plant parasitic nematodes present. After a total of twelve weeks, Composition II was still effective whereas Composition III dropped off in effectiveness and, from an appearance standpoint, Composition II flats were excellent while the Composition III flats had declined to the point of becoming similar to the check flats.

The good shelf stability of the compositions of this invention is an important commercial characteristic thereof. Obviously, such compositions would not be adequate if their effectiveness and utility deteriorate too rapidly on storage. Thus compositions similar to Composition III, containing 20–25% of "Atlox 1256" lack sufficient stability to compete with the nematocidal compositions of this invention. Similarly, compositions containing 20–30% of emulsifiers sold under the trademark "Gafac RM 710" and "Gafac RM 510," or 25–40% of emulsifiers sold under the trademark "Igepal DM 710," in place of the "Emullat P 140 HFP," were insufficiently stable for use as nematocides. On the other hand, compositions of the present invention exhibit shelf-life potential of up to six years.

What is claimed is:

1. A method for controlling nematodes which comprises applying to said nematodes a composition comprising about 25 to 70% by weight of O,O-diethyl-O-(2-isopropyl-4-methyl-6-pyrimidyl) thiophosphate and about 5 to 40% by weight of an emulsifier consisting essentially of about 33% of the calcium salt of dodecyl benzene sulfonate and about 47% nonylphenol polyoxyethylene in about 20% of butanol.

2. A method as in claim 1 wherein the composition is applied to said nematodes by applying the composition to a nematode infested area in amounts equivalent to about 40 pounds of thiophosphate per acre of treated area.

References Cited

UNITED STATES PATENTS

| | | | |
|---|---|---|---|
| 2,754,243 | 7/1956 | Gysin | 167—330 |
| 3,124,602 | 3/1964 | Altscher | 167—42 |

ALBERT T. MEYERS, Primary Examiner

STANLEY J. FRIEDMAN, Assistant Examiner